July 10, 1956     M. N. YARDNEY     2,753,620
BATTERY-TERMINAL CONNECTION METHOD
Original Filed Dec. 6, 1949
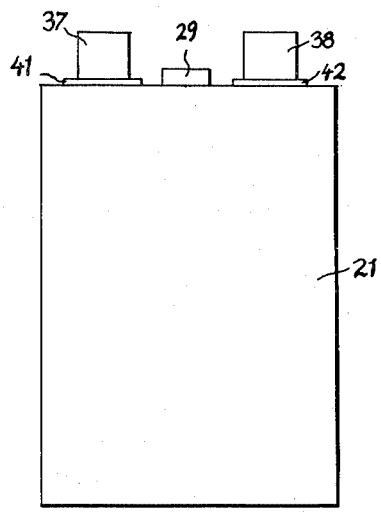
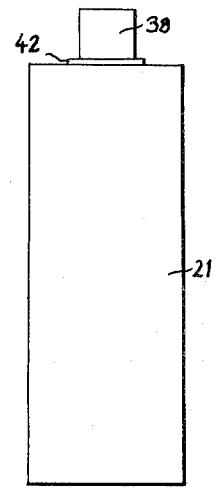
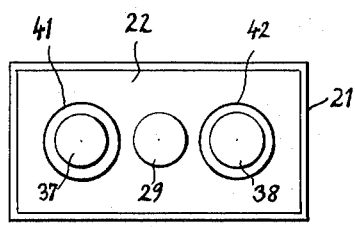
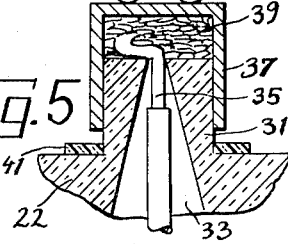
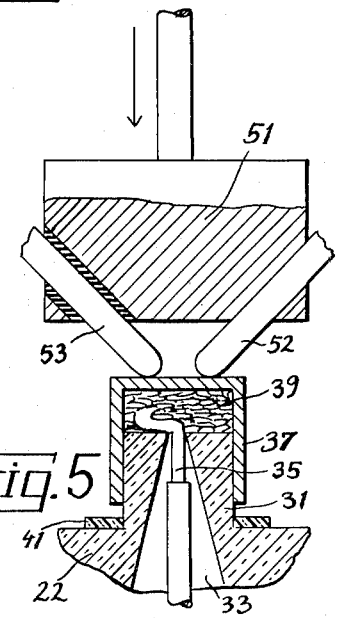
MICHEL N. YARDNEY
INVENTOR.
BY
Karl F. Ross
AGENT

United States Patent Office 2,753,620
Patented July 10, 1956

2,753,620

BATTERY-TERMINAL CONNECTION METHOD

Michel N. Yardney, New York, N. Y., assignor to Yardney International Corp., New York, N. Y., a corporation of New York Original application December 6, 1949, Serial No. 131,320. Divided and this application August 9, 1951, Serial No. 241,718

5 Claims. (Cl. 29—155.55)

This invention relates to rechargeable batteries of the silver and zinc type in which the electrodes, consisting of silver and zinc and/or their oxides (depending upon the state of charge) preferably in powder form, are held under considerable pressure in a receptacle or casing containing little if any free electrolyte; this application is a division of my co-pending application Ser. No. 131,320, filed December 6, 1949, now U. S. Patent No. 2,601,133.

An object of the instant invention is to provide, in a battery as set forth above, a method forming a low-ohmic, shockproof electrical connection between the electrodes and the external terminals, as well as a method of making such a connection.

The above and other objects of the invention will become apparent from the following description, reference being had to the accompanying drawing in which:

Fig. 1 is a side elevational view of a battery made in accordance with the principles of the present invention;

Fig. 2 is an end elevational view of the battery of Fig. 1,

Fig. 3 is a top view of the battery of Fig. 1;

Fig. 4 is a detail view illustrating a step in the formation of a terminal connection according to the invention; and Fig. 5 is another detail view showing a subsequent step in the formation of the terminal connection.

Referring to Figs. 1–3, there is shown a battery comprising a casing 21, a cover or lid 22 for this casing, and a set of electrodes including a positive electrode, and a negative electrode. The positive electrode preferably consists, essentially, of powdered silver which is at least partially converted into silver peroxide $Ag_2O_2$ when the battery is charged; the negative electrode preferably consists, essentially, of powdered zinc which is at least partially converted into zinc oxide $ZnO$ when the battery is discharged.

The cover 22 is seated in a recess of the casing 21. The casing 21 and its lid 22 consist of a suitable plastic material, preferably polystyrene.

The lid 22 is further provided, on opposite sides of the plug 29, with upstanding cylindrical projections e. g. 31, each provided with a conical, upwardly tapering bore 33 through which passes a respective conductor wire 35. The wires 35, whose lower extremities are embedded in the electrodes, are coated with a suitable insulant such as rubber and this coating extends partly into the electrode, as clearly seen in Fig. 5. The tops of the wires are conductively connected to preferably silver plated metal caps 37, 38, which respectively embrace the projections e. g. 31, by means of blobs of solder 39 which also serve to hold the caps in place. Washers 41, 42, preferably distinctly colored to identify the negative and the positive terminal, surround the projections and are held in place by the caps 37, 38, respectively. The projections such as 31 and their associated caps may also differ in size for more convenient identification.

Figs. 4 and 5 illustrate how the conductor wires, metal caps and washers are advantageously assembled to form a rigid unit with the projections 31 of the lid 22. As shown in Fig. 4, the metal cap (e. g. the cap 37) is first inverted and filled with a predetermined amount of solder in the form of small fragments 39. The inverted lid 22, with a suitable length of wire 35 extending from its corresponding projection 31, is then brought down so that the cap 37 embraces the projection 31, causing the wire to buckle and trapping the solder pieces 39 in the intervening space. The lid may now be righted, as shown in Fig. 5, whereupon the cap 37, solder 39 and wire 35 are heated to melt the solder while the simultaneous exertion of pressure upon the cap forces the latter down upon the washer 41, thus giving the assembly shown in Figs. 1 and 3. The simultaneous application of heat and pressure may be accomplished by bringing a piston head 51, provided with a grounded positive electrode 52 and a suitably insulated negative electrode 53, down upon the cap 37 as illustrated in Fig. 5. The solder 39, transformed into the homogeneous mass 39, thus conductively and mechanically joins the wire 35 to the cap 37 which, by being thus held in place, also prevents the detachment of washer 41.

It should be understood that the invention is not limited to the precise method and structure shown and described, being, on the contrary, capable of numerous modifications and adaptations without exceeding its scope as defined in the objects and in the appended claims.

What is claimed is:

1. A method of establishing a terminal connection for an electrode enclosed in a battery casing, said casing having an external projection of insulating material traversed by a bore leading to the interior of the casing; said method comprising the steps of conductively connecting one end of a conductor wire to said electrode, passing the other end of said conductor wire through said bore with said conductor substantially filling said bore, forming a metal cap adapted to fit snugly around said projection, partially filling said cap with solder, introducing said projection into said cap, imbedding said other end of said wire in said solder, compacting said solder around said other end by compressing and confining said solder between said cap and said projection, and simultaneouly heating said cap, thereby forcing said cap, said solder and said wire together as a mechanical and galvanic unit.

2. The method according to claim 1, wherein said cap is heated by placing it in contact with a pair of metallic members connected to a source of heating current, said members exerting pressure upon said solder through said cap while completing a circuit to said source through said cap and said solder.

3. A method of establishing a terminal connection for an electrode enclosed in a battery casing, said casing having an external projection of insulating material traversed by a bore leading to the interior of said casing; said method comprising the steps of conductively connecting one end of a flexible conductor wire to said electrode, passing the other end of said conductor wire through said bore with said conductor substantially filling said bore, forming said other end into an offset portion preventing the withdrawal thereof through said bore, forming a metal cap adapted to fit snugly around said projection, partially filling said cap with solder, introducing said projection into said cap, imbedding said offset portion of said wire in said solder, compacting said solder around said offset portion by compressing and confining said solder between said cap and said projection, and simultaneously heating said cap, thereby forcing said cap, said solder and said wire together as a mechanical and galvanical unit.

4. A method of establishing a terminal connection for an electrode enclosed in a battery casing, said casing having an external projection of insulating material traversed by a bore leading to the interior of said casing; said method comprising the steps of conductively connecting one end of a conductor wire through said bore, forming a metal cap adapted to fit snugly around said projection, partially filling said cap with solder, introducing said projection into said cap, thereby bringing said other end of said conductor wire into direct contact with said solder, placing an annular marking element around said projection, sandwiching said marking element under pressure between said casing and said cap, thereby clamping said element in position between said casing and said cap, and heating said cap while continuing said pressure, thereby forcing said cap, said solder and said wire together as a mechanical and galvanic unit.

5. A method of establishing a terminal connection for an electrode enclosed in a battery casing, said casing having an external projection of insulating material traversed by a bore leading to the interior of the casing; said method comprising the steps of conductively connecting one end of a conductor wire to said electrode, passing the other end of said conductor wire through said bore, forming a metal cap adapted to fit snugly around said projection, partially filling said cap with solder, introducing said projection into said cap, imbedding said other end of said wire in said solder, compacting said solder around said other end by compressing said solder between said cap and said projection, simultaneously heating said cap, thereby forcing said cap, said solder and said wire together as a mechanical and galvanic unit, placing an annular marking element around said projection, and sandwiching said element between said casing and cap, thereby clamping said element in position between said casing and said cap.

References Cited in the file of this patent

UNITED STATES PATENTS

| | | |
|---|---|---|
| 455,986 | Hayes et al. | July 14, 1891 |
| 535,090 | Brewer | Mar. 5, 1895 |
| 1,950,156 | Swoboda | Mar. 6, 1934 |
| 2,215,476 | Peters | Sept. 24, 1940 |
| 2,270,166 | Hiensch et al. | Jan. 13, 1942 |
| 2,512,426 | Hartley | June 20, 1950 |
| 2,535,397 | Duch et al. | Dec. 26, 1950 |
| 2,659,790 | Jurgensen | Nov. 17, 1953 |

FOREIGN PATENTS

| | | |
|---|---|---|
| 3,022 | Great Britain | of 1904 |